Dec. 24, 1935.  W. J. SCHWEITZER  2,025,674
APPARATUS FOR MAKING ALCOHOLIC BEVERAGES
Filed July 24, 1933
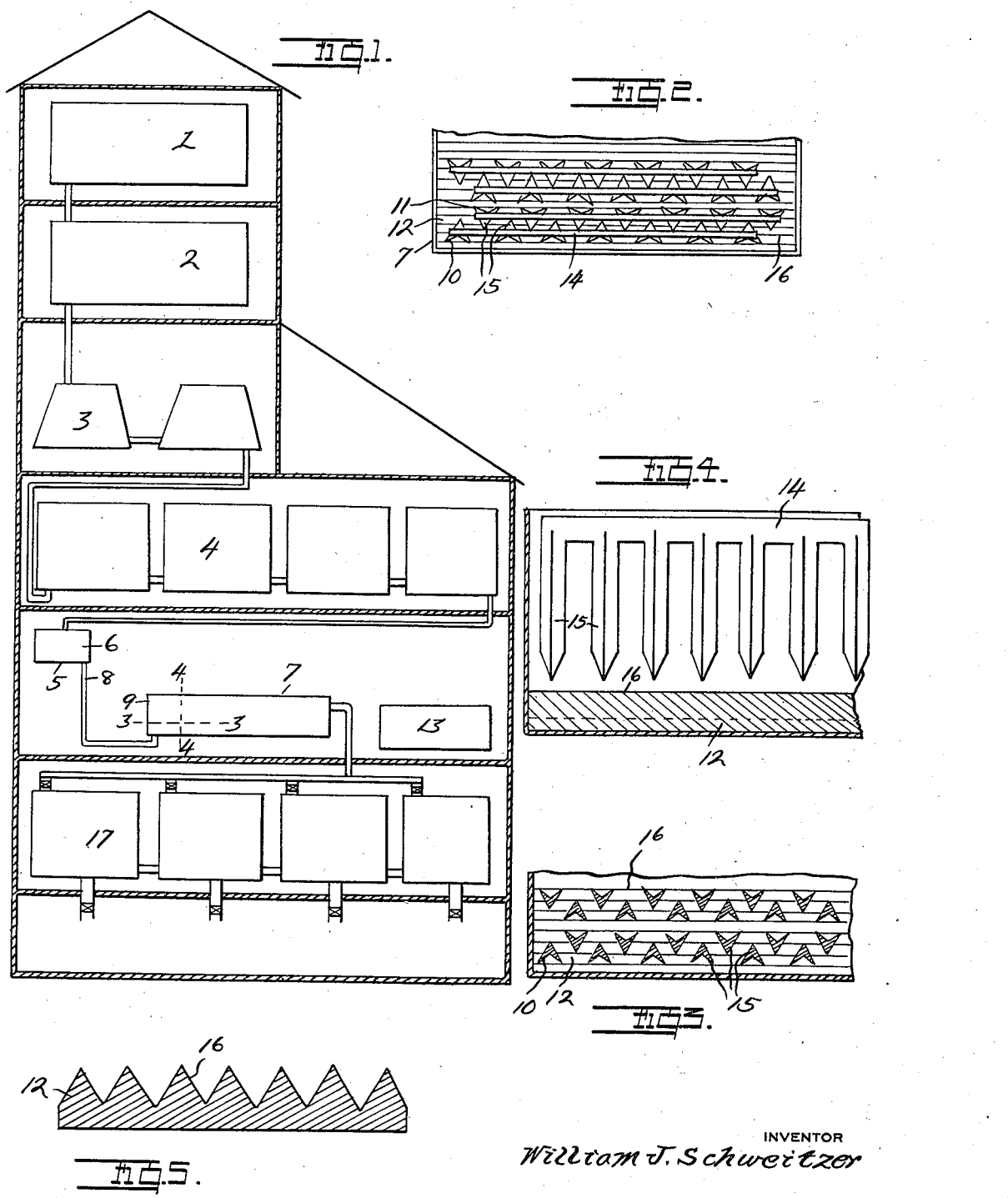

Patented Dec. 24, 1935

2,025,674

UNITED STATES PATENT OFFICE 2,025,674

APPARATUS FOR MAKING ALCOHOLIC BEVERAGES

William J. Schweitzer, Detroit, Mich.

Application July 24, 1933, Serial No. 681,988

6 Claims. (Cl. 204—26)

The invention relates to the manufacture of alcoholic beverages, such as beer, wine and whiskey, and refers more particularly to the manufacture of beer. The invention has for one of its objects to materially shorten the time necessary to age the beverage, thereby greatly enhancing its flavor and palatability, by providing an improved apparatus and method. Another object is to provide an improved electrolyzing apparatus which effectively and efficiently ages the liquid.

These and other objects of my invention will become more apparent from the following description and claims, taken in connection with the accompanying drawing, in which Figure 1 is a diagrammatic elevation of an apparatus embodying my invention;

Figure 2 is an enlarged plan view of the electrolyzing apparatus;

Figures 3 and 4 are enlarged cross sections of the electrolyzing apparatus, respectively on the lines 3—3 and 4—4 of Figure 1;

Figure 5 is a vertical longitudinal section through the lower electrode of the electrolyzing apparatus.

The apparatus illustrated in the present instance is designed particularly for the manufacture of beer and, as illustrated in Figure 1, 1 is the beer tank for receiving the brewed wort, which has been formed in the usual manner, 2 the cooling apparatus for receiving the liquid from the beer tank, 3 the settling tank or tanks for receiving the liquid from the cooling apparatus, and 4 the fermenting tank or tanks for receiving the liquid from the settling tank or tanks. This apparatus, as thus far described, is the usual apparatus used in the manufacture of beer.

5 is the filtering apparatus comprising the tank 6 for receiving the liquid from tthe fermenting tank or tanks 4 and within which is located the filter through which the fermented liquid passes. This filtering apparatus is one of the usual types used in the manufacture of beer, the arrangement being such that any type may be used.

After the liquid has passed through the filtering apparatus, it is conducted to the electrolyzing apparatus 7 by the pipe 8 which opens into the lower portion and at one end of the tank 9 of the electrolyzing apparatus. 10 and 11 are respectively the vertical positive and negative electrodes arranged alternately in series within the tank 9 between its inlet and outlet ends and extending transversely thereof and 12 is the horizontal negative electrode extending longitudinally within the tank 9 below the electrodes 10 and 11. These electrodes are suitably connected to the positive and negative terminals of the power plant 13. The electrodes 10 and 11 are comb-shaped, each having the upper horizontal bar 14 and the depending laterally spaced teeth 15. These teeth have cross sections, which, as shown are "barbed arrow-head" shaped which present acute angular edges facing in a direction opposite to that of the flow of the liquid through the electrolyzing tank. Furthermore, the electrodes 10 and 11 are arranged so that the teeth of adjacent electrodes are staggered, as shown more particularly in Figure 3. The negative electrode 12, as shown more particularly in Figure 5, is in the nature of a plate having a serrated upper surface presenting the upwardly extending teeth 16 which extend transversely of the electrolyzing tank and are located adjacent to the lower ends of the teeth 15, these lower ends being preferably pointed, as shown more particularly in Figure 4.

The liquid is passed through the electrolyzing apparatus preferably at a slow uniform rate and direct current of relatively low voltage is passed through this liquid during its flow. In order to quickly, thoroughly and satisfactorily treat the liquid, its temperature while being electrolyzed should not be above 70 degrees F., although it may be lower. In fact the usual brewery temperature is lower, it being in the neighborhood of 39 degrees F. While the relatively low voltage is maintained, the voltage is increased as the temperature decreases.

The composition of the electrodes 10, 11 and 12 must of necessity vary, because of the various waters and materials used. Carbon electrodes have not proven themselves adaptable and results have not warranted their use. The main objection to carbon electrodes is their fragility, which cause, through breakage, possible short circuits in the electrolyzing apparatus. My electrodes are formed of metal, such as aluminum, or zinc or a combination thereof, or a combination thereof with other metals, which metal has a colorless oxide which is not detrimental in imparting a metallic taste to the finished product and which is known to be soluble when taken into the human system.

After the liquid has been passed through the electrolyzing apparatus, it may then be passed through the usual storage and chilling tank, or tanks 17, where after chilling it is ready for further treatment, such as the usual carbonization, bottling or racking off into barrels, when the commercially finished product is ready for consumption.

By passing the fermented liquid through the electrolyzing apparatus at a slow even rate where it is subjected to relatively low voltage direct current, this liquid becomes completely and thoroughly aged and sterilized within a relatively short time, thereby securing the liquid against further fermentation and producing the desired improvement in flavor and palatability which heretofore has taken weeks or months in beers. Furthermore, the electrolyzing produces the desired aroma and increases the action of the foam producing elements in the fermented liquid. Furthermore, by reason of the particular shape of the electrodes of the electrolyzing apparatus and their arrangement, they tend to retard the flow of the liquid while passing through the electrolyzing apparatus and tend to insure positive contact with the electrodes to thoroughly and completely treat all of the liquid.

What I claim as my invention is:

1. In an apparatus for making an alcoholic beverage, the combination with a fermenting tank, of electrolyzing apparatus comprising a tank for receiving the fermented liquid and substantially parallel alternate positive and negative electrodes and a negative electrode extending transversely of and adjacent to said first mentioned electrodes, all of said electrodes being within said last mentioned tank and arranged in the path of flow of the liquid.

2. In an apparatus for making an alcoholic beverage, the combination with a fermenting tank, of electrolyzing apparatus comprising a tank for receiving the fermented liquid and substantially vertical alternate positive and negative electrodes and a substantially horizontal negative electrode extending adjacent to said first mentioned electrodes, all of said electrodes being within said last mentioned tank and arranged in the path of flow of the liquid.

3. An electrolyzing apparatus comprising a tank and a plurality of alternately arranged positive and negative electrodes therein, said electrodes being of comb-like form and vertically arranged and having depending portions located in staggered relation, said depending portions being of barbed-arrow shape in cross section.

4. An electrolyzing apparatus comprising a tank and a plurality of alternately arranged positive and negative electrodes therein, said electrodes being of comb-like form and vertically arranged and having depending portions located in staggered relation, said depending portions each having a plurality of inclined surfaces facing in a direction transverse to the flow of liquid through the tank.

5. An electrolyzing apparatus comprising a tank having an inlet and an outlet for liquid arranged so that the liquid will flow from one end of the tank to the other, and a plurality of alternately arranged positive and negative electrodes of comb-like form within the tank, the electrodes having depending portions arranged in staggered relation and of angular shape in cross section to define inclined surfaces converging to edges and opposing the flow of the liquid through the tank.

6. An electrolyzing apparatus comprising a tank adapted to have liquid flow therethrough, a plurality of alternately arranged positive and negative electrodes of comb-like form within the tank, said electrodes having depending portions arranged in staggered relation, and an additional negative electrode located beneath said electrodes and having a series of edges extending toward and cooperating with the lower extremities of the depending portions of said first named electrodes.

WILLIAM J. SCHWEITZER.